(12) United States Patent
Fritsche et al.

(10) Patent No.: US 7,934,892 B2
(45) Date of Patent: May 3, 2011

(54) COLLET CLAMPING NOSEPIECE FOR POWER FEED DRILLING EQUIPMENT

(75) Inventors: David L. Fritsche, Foristell, MO (US); Michael P. Matlack, St. Charles, MO (US); Dennis R. Mathis, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 1175 days.

(21) Appl. No.: 11/610,388

(22) Filed: Dec. 13, 2006

(65) Prior Publication Data

US 2008/0145160 A1 Jun. 19, 2008

(51) Int. Cl.
B23B 45/14 (2006.01)
B23B 47/34 (2006.01)
B23B 51/06 (2006.01)

(52) U.S. Cl. ............... 408/56; 408/67; 408/72 R

(58) Field of Classification Search ......... 408/56, 408/67, 72 R, 79, 80, 97; B23B 45/14, 47/34, B23B 51/06
See application file for complete search history.

(56) References Cited

U.S. PATENT DOCUMENTS

| | | | | |
|---|---|---|---|---|
| 2,246,916 A * | 6/1941 | Fischer | ............... | 408/56 |
| 2,839,953 A * | 6/1958 | Hanger | ............... | 408/72 R |
| 2,935,905 A * | 5/1960 | Winslow | ............... | 408/112 |
| 3,663,115 A * | 5/1972 | Vindez et al. | ............... | 408/79 |
| 3,767,313 A * | 10/1973 | Bohoroquez et al. | ............... | 408/14 |
| 4,443,139 A * | 4/1984 | Eash | ............... | 408/14 |
| 4,594,030 A * | 6/1986 | Weigel, Jr. | ............... | 408/10 |
| 5,062,746 A * | 11/1991 | Deremo | ............... | 408/79 |
| 5,125,139 A * | 6/1992 | Ohta | ............... | 29/26 A |
| 5,277,526 A * | 1/1994 | Corsi | ............... | 408/97 |
| 5,356,245 A * | 10/1994 | Hosoi et al. | ............... | 408/56 |
| 5,395,187 A | 3/1995 | Slesinski et al. | | |
| 5,482,411 A | 1/1996 | McGlasson | | |
| 5,584,618 A | 12/1996 | Blankenship et al. | | |
| 5,628,592 A * | 5/1997 | Ringer | ............... | 408/97 |
| 7,611,314 B2 * | 11/2009 | Lipczynski et al. | ............... | 409/200 |
| 2004/0212158 A1 * | 10/2004 | Chen | ............... | 279/52 |
| 2009/0279969 A1 * | 11/2009 | Mejerwall | ............... | 408/115 R |

\* cited by examiner

Primary Examiner — Eric A Gates
(74) Attorney, Agent, or Firm — Armstrong Teasdale LLP

(57) ABSTRACT

A collet clamping nosepiece for a power feed drill is described which includes at least one clamping piston located along a centerline of the nosepiece, an expansion mandrel comprising a frusto-conical exterior surface, and an expandable collet. The expandable collet is configured to substantially surround the expansion mandrel and operatively connect to the at least one clamping piston. Operation of the at least one clamping piston causes the mandrel to move along the exterior surface of the expansion mandrel for engagement and disengagement of the collet with a bore configured for insertion of the collet.

18 Claims, 4 Drawing Sheets

COLLET CLAMPING NOSEPIECE FOR POWER FEED DRILLING EQUIPMENT

BACKGROUND OF THE INVENTION

This invention relates generally to precision drilling operations, and more specifically, to a collet clamping nosepiece for power feed drilling equipment.

Many applications, such as automotive and aircraft fabrication, require precisely positioned holes to be drilled into a workpiece. The holes must be accurately aligned with only relatively small positioning errors tolerable. Accordingly, a drill plate is typically aligned and mounted in a fixed relation to the workpiece prior to drilling holes in the workpiece. The drill plate has one or more accurately positioned holes extending therethrough such that by properly aligning the drill plate with respect to the workpiece, a hole in the drill plate precisely overlies the desired location for a corresponding hole to be drilled in the workpiece.

Traditionally, the assembly of aerospace products involves mounting power feed drill motors to dedicated drill plates which establish hole location and normality with respect to the product being assembled, react to drilling thrust, and support the weight of the drill motor. Therefore, the operator of the drill does not have to offset the full weight of the drill motor and the thrust generated during the drilling operation. Attachment of the drill motor to the drill plate further ensures proper alignment of the cutting tool of the drill with the desired hole location in the workpiece. In many instances, the accurately positioned holes must be drilled in relatively hard materials, such as titanium. To drill holes in such materials, it is desirable to use power feed or rack feed drill motors which produce relatively great amounts of axial thrust. Typically, these motors are configured such that the drill spindle and cutting tool are actuated with pneumatic and/or hydraulic power, or with the assistance of a rack and pinion drive. Since these motors are generally heavy and produce a relatively great amount of thrust, however, the drill motor is generally firmly clamped to a drill plate and the drill plate is, in turn, firmly clamped to the workpiece. Accordingly, the affixation of a drill motor to a drill plate eliminates the need for the drill motor operator to apply axial pressure during the drilling operation.

To enable the drill motor to be easily mounted to the drill plate in any orientation, colleting mechanisms have been used as integrated components of the drill motor or added as a separate colleting nosepiece accessory. These collet clamping mechanisms are frequently bulky, require special length cutters and in many instances are awkward to remove, service, and use.

Each integrated collet clamping mechanism only works for one specific drill motor. Consequently, colleting nosepieces that could be added as an accessory to several drill motors were developed. However, these nosepieces must produce clamping forces in the range of 270 lbs to 850 lbs to securely mount the drill motor to the drill plate. To provide such clamping forces, bulky pneumatic pistons have been incorporated into nosepiece designs that either make the above mentioned cutter very long, or create a large obstacle at the end of the drill motor that prevents access to numerous hole locations on aircraft structures.

One previous attempt to produce a collating nosepiece is documented in U.S. Pat. No. 5,395,187. The device described in this patent is rather large and bulky. In the exemplary embodiment, the overall length was 7.25 inches, the diameter was 5.75 inches, and requires a ten inch long cutter. The tip to the nosepiece is relatively slender at 1.25 inches in diameter, but is only 2.5 inches long. The relatively short length is not long enough to clear standard length wedgelocks. Consequently, this device has seen only limited implementation.

Another collating nosepiece is documented in U.S. Pat. No. 5,482,411 has been an improvement over the above described collating nosepiece. The outside diameter of the collating nosepiece was reduced to three inches, due to the use of two air pistons on the same piston rod, and the overall length was reduced to about 6.5 inches. It has been implemented in at least one aircraft structure application, but still has disadvantages. For example, this colleting nosepiece has an outside diameter of about three inches which limits the areas of aircraft structure that it can access and frequently interferes which wedgelocks, which are typically used to clamp aircraft structure together prior to drilling. This colleting nosepiece also requires the utilization of relatively expensive nine inch long twist drills due to the location of the air pistons that provide the clamping force.

Additionally, the drilling debris must travel approximately 3.5 inches to a vacuum collection chamber causing clogs and excessive down time. In order to change the collet or the mandrel of the colleting nosepiece described by U.S. Pat. No. 5,482,411, the entire nosepiece must be removed and disassembled. Removal and disassembly is a time-consuming, and therefore expensive, process.

This collating nosepiece also requires utilization of drill plates with a specific thickness and a specific drill plate liner, limiting the implementation of the collecting nosepiece. This collating nosepiece also relies on the surface of the drill plate for normality. It is fairly difficult to provide the required normal surface on highly contoured drill plates and adds a spot-facing operation to the cost of the drill plates. Finally, the drill bushing must be spring-loaded against the mold line surface to form a vacuum seal. For this to occur, the operator must push on the back of the drill motor set-up to compress the spring, holding it in place while the operator activates the colleting nose. This situation is an ergonomic issue and frequently causes improper clamping of the drill motor to the drill plate resulting in oversized holes.

Another known concentric collet nosepiece which has an overall length of about 3.5 inches, but this length is accomplished by situating the clamp piston off to the side of the expansion mandrel and the collet. The clamping force is transmitted to the collet through two pivoting clamp arms. The clamp piston and the associated mechanism extend about 4.15 inches from the centerline of the twist drill and are an obstacle that interferes with adjacent tooling, structures, and wedgelocks.

BRIEF DESCRIPTION OF THE INVENTION

In one aspect, a collet clamping nosepiece for a power feed drill is provided. The nosepiece includes at least one clamping piston located along a centerline of the nosepiece, an expansion mandrel comprising a frusto-conical exterior surface, and an expandable collet configured to substantially surround the expansion mandrel. The collet is operatively connected to the at least one clamping piston, and operation of the at least one clamping piston causes the collet to move along the exterior surface of the expansion mandrel for engagement and disengagement of the collet with a bore configured for insertion of the collet.

In another aspect, a method for fabricating a drill motor nose piece is provided. The method includes configuring a fore end of the nosepiece with a collet that substantially surrounds a frusto-conical exterior surface of an expansion mandrel, operatively connecting the collet to at least one clamping piston located along a centerline of the nosepiece, and configuring the at least one clamping piston to move the collet along the exterior surface of the expansion mandrel, thereby increasing a circumference of the collet.

In still another aspect, a method for engaging a drill plate having at least one bore therethrough and mounted onto a workpiece with a drill motor nosepiece is provided. The method includes inserting a fore end of the nosepiece having a collet that substantially surrounds a frusto-conical exterior surface of an expansion mandrel into one of the bores, and operating at least one clamping piston located at an aft end of the nosepiece to cause the collet to move along the mandrel, causing the collet to expand radially and engage the bore in the drill plate.

In yet another aspect, a collet clamping nosepiece for a power feed drill is provided that includes an expandable collet located at a fore end of the nosepiece, and a piston assembly aligned axially with the expandable collet along a centerline of the nosepiece. The piston assembly is operatively connected to the expandable collet and operable to expand and contract the expandable collet.

DETAILED DESCRIPTION OF THE INVENTION

Figure 1:
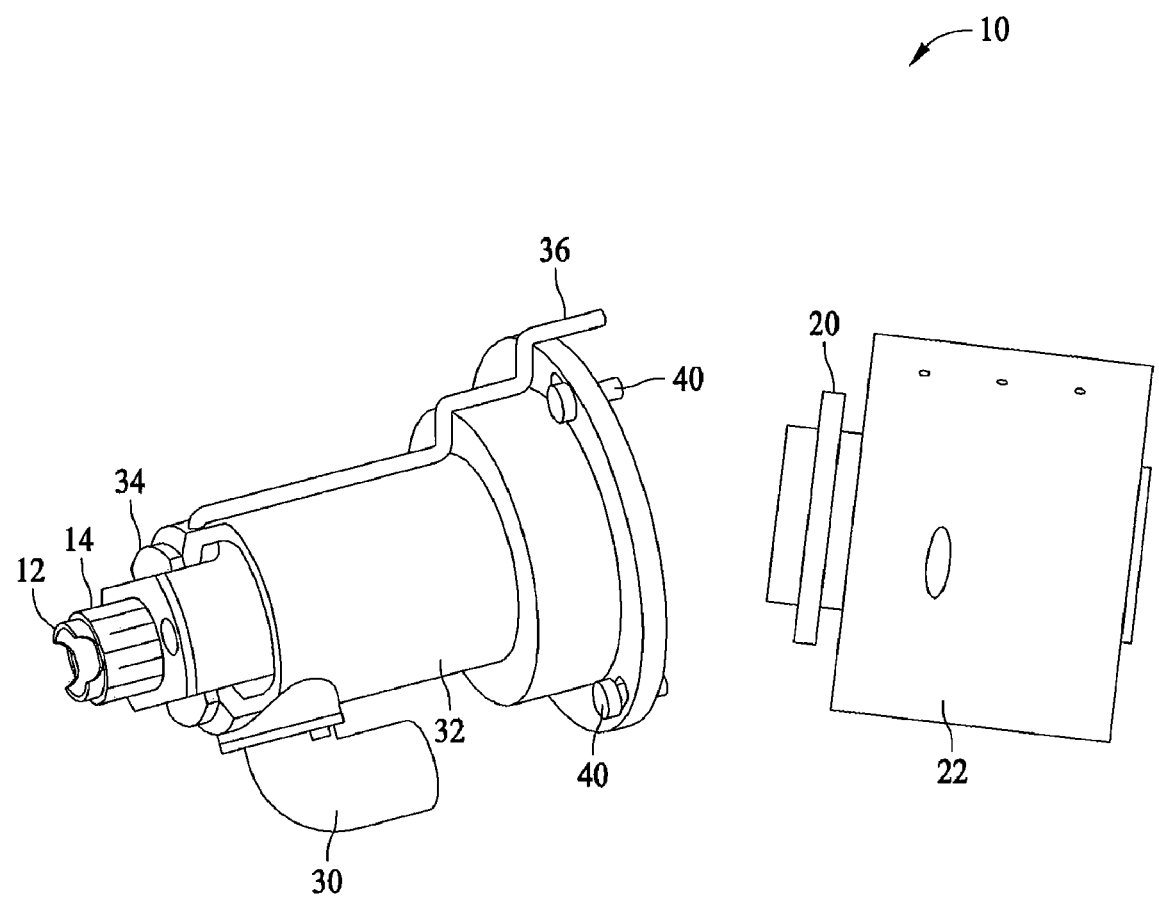
FIG. 1 is an illustration of a collet clamping nosepiece 10 for utilization with power feed drilling equipment.

FIG. 1 is an illustration of a collet clamping nosepiece 10 for utilization with power feed drilling equipment. Collet clamping nosepiece 10 solves many of the problems in the prior art described above by using multiple pistons on a common piston rod to generate, for example, up to 850 pounds of clamp force while maintaining a small envelope size as compared to the previous collating nose piece configurations.

Referring more specifically to FIG. 1, collet clamping nosepiece 10 includes an expansion mandrel 12 having a frusto-conical shape which causes expanding collet 14 to expand and engage, for example, a hole within a drill plate (not shown) when collet clamping nosepiece 10 is utilized with a power drill. Clamp piston 20 has a bore therethrough along its centerline and is surrounded by a piston housing 22, both of which are located along a center line of nosepiece 10. Pistons 20 are located at a very aft end of nosepiece 10 in order to maximize accessibility to tight areas of aircraft structure, for example, enabling its use directly adjacent to wedge-lock clamps (not shown, but common in aircraft assembly). Such a configuration for nosepiece 10 provides a more efficient evacuation path for drilling and debris removal than is found with previous drill and nosepiece assemblies, and further enables the use of standard six inch long twist drills.

Collet clamping nosepiece 10 further includes a vacuum collection tube 30 for removal of debris, and attached to nosepiece housing 32, and an inner pull sleeve 34 to which collet 14 is attached. A coolant delivery line 36 is also provided. Quick disconnecting fasteners 40 are utilized to connect nosepiece housing 32 to piston housing 22.

The quick disconnect allows for easy removal and insertion of cutting tools (e.g., drill bits) into mandrel 12. Additionally, wear items that typically require frequent replacement (i.e., the collet 14 and the corresponding expansion mandrel 12) can be removed from nosepiece 10 by simply removing two screws. No further disassembly of the nosepiece is required, as is the case with the prior art nosepiece configurations.

Now referring more specifically to expansion mandrel 12 and clamping collet 14, the straight configuration of collet 14 (e.g., without a lip) allows collating nosepiece 10 to be used with a variety of drill plate thicknesses as there is no collet lip to engage a backside of a drill plate. The fixed expansion of mandrel 12 also eliminates the need for a spring-loaded vacuum collection drill bushing. Additionally, fixed expansion mandrel 12 also provides a simple way to locate the drill motor relative to the surface of a structure to be processed (e.g., drilled), enabling drill/countersink processes.

Since collet 14 clamps to a drill plate by expanding radially within the hole rather than pulling the front of the nosepiece against the face of the drill plate through the use of a collet lip, the normality between a drill and a drill plate is only dependent on the position of the drill plate liner and not the surface of the drill plate. To achieve the benefits of using fixed expansion mandrel 12, the collet 14 has to be able to move as it expands. Though collet 14 is on the outside of the mechanism of nosepiece 10, the moving linkage (not shown in FIG. 1) that pulls collet 14 along mandrel 12 is located within nosepiece 10 to be internal to the mechanism, thereby avoiding pinch points. To accomplish the internal placement of the moving linkage, clamping pistons 20 and piston housing 22 are a separate assembly from the balance of the nosepiece mechanism 10 (as shown in FIG. 1) minimizing the details associated with cutting tool changes.

Figure 2:
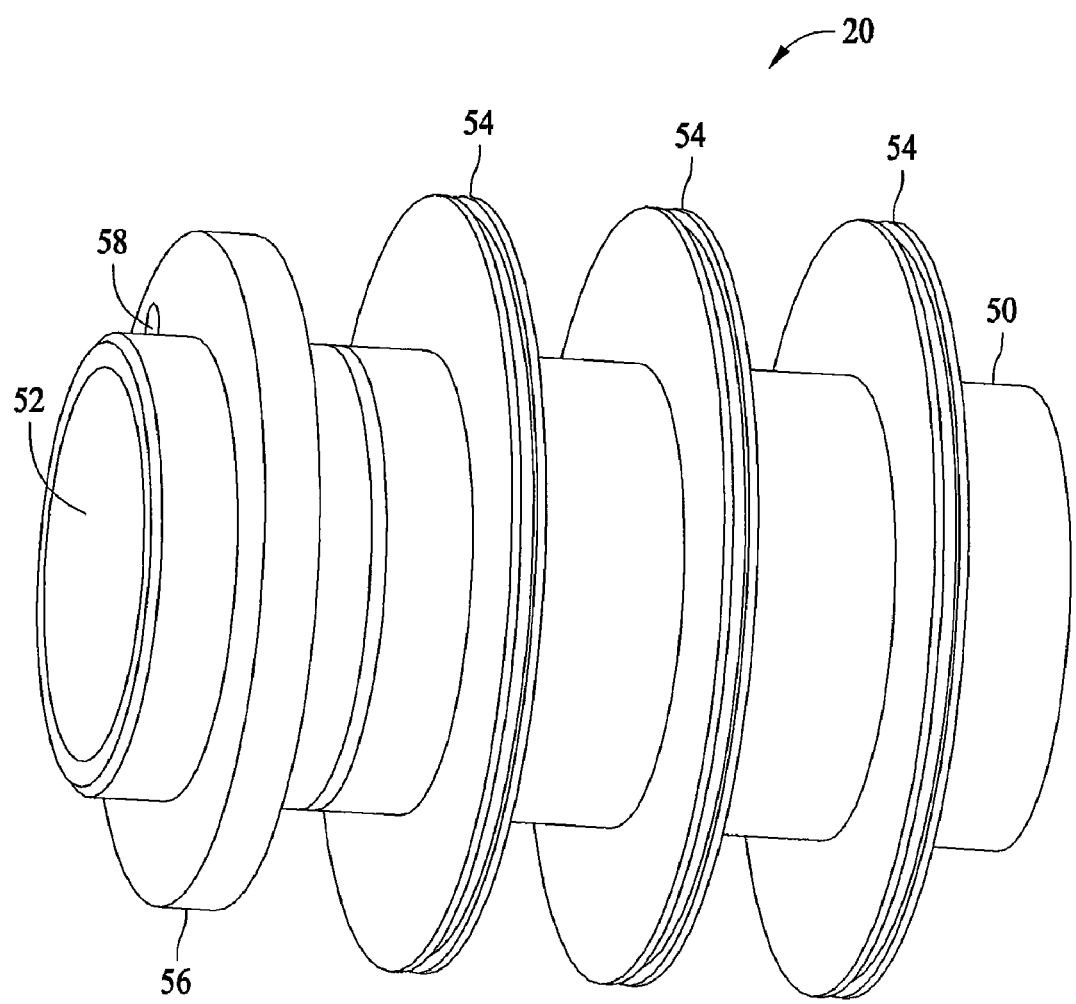
FIG. 2 is an illustration of a device that includes multiple pistons on a single piston rod.

In order to generate the force (e.g., 850 pounds) necessary to pull collet 14 rearward and securely clamp the drill motor to a drill plate, an air cylinder that includes multiple pistons on a single piston rod was developed as illustrated in FIG. 2. More specifically, piston 20 includes a cylindrical shaft 50 having a bore 52 therethrough and at least one piston ring 54 arranged coaxially with and extending from cylindrical shaft 50. Piston 50 also include a sleeve 56 arranged coaxially with and extending from cylindrical shaft 50 including at least one hole 58 formed therein for attachment a linkage for moving collet 14 as described above. Utilization of multiple piston rings 54 allowed use of one very large air piston or a hydraulic cylinder to be avoided.

Figure 3:
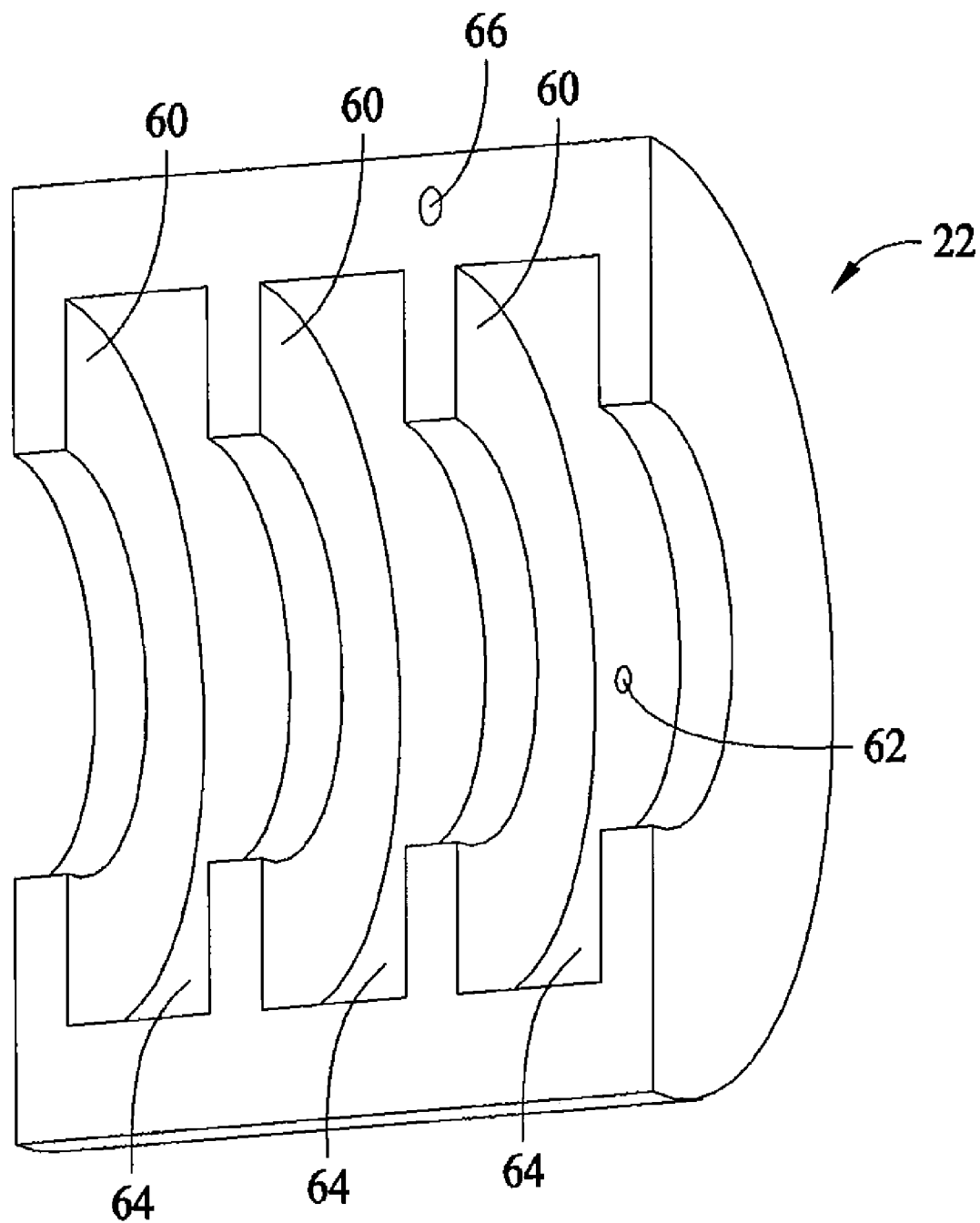
FIG. 3 is an illustration of a portion of a clamshell piston housing configured for placement around the multiple piston device of FIG. 2.

In one embodiment, the multiple piston cylinder of piston 20 is unique in that the piston rod (e.g., cylindrical shaft 50) and the pistons rings 54 are one solid piece of material. The one piece configuration of piston 50 is accomplished by using a clamshell design for piston housing 22 as illustrated in FIG. 3. Using this approach, piston housing 22 is assembled around the pistons 50 and their respective piston rings 54 to have a sealing engagement with piston housing 22 As illustrated by FIG. 3, piston housing 22 is configured with a plurality of cylinder portions 60, which substantially surround the respective piston rings 54 when two clamshell halves of piston housing 22 are assembled.

In one embodiment, and referring to piston housing 22, air passages 62 are machined into a wall 64 of the piston housing 22 and the two halves of the clamshell are configured with one or more pins and receptacles 66 to establish a precision location relative to one another and fastened together to maintain structural integrity. The result is a very simple and easy to assemble multiple piston pneumatic cylinder as shown in FIG. 1.

The position of the piston 20 and piston housing 22 also provides additional benefits. Specifically, since the inside diameter of the piston rod (e.g., cylindrical shaft 50) is big enough for a drilling tool holder, both are positioned at the same axial position. This results in a reduction of drilling bit length as compared to at least one of the prior art drilling nosepieces described above, where the twist drill has to reach through two clamp pistons and a 9 inch overall length is required.

Since six inches is a standard length for cutting tools, a re-occurring perishable tool savings is realized. By having the clamp piston assembly (e.g., piston 20 and piston housing 22) at the aft end of nosepiece 10, a vacuum collection system attached to vacuum collection tube 30 has an increased efficiency over the prior art nosepiece assemblies. In a particular prior art assembly, drilling debris travels up the drill bushing, through two clamp pistons, and then into the vacuum chamber which is about a three and one-half inch journey. In the described embodiments, drilling debris travels up the drill bushing then directly into the vacuum collection chamber since the pistons 20 and housings 22 are located at the aft end of nosepiece 10. Such an arrangement is much more efficient and will prevent clogging of any vacuum collection system attached to vacuum collection tube 30.

Another advantage associated with nosepiece 10 is that pistons 20 and piston housing 22 remain in place on the drill motor during cutting tool changes. Specifically, only the long cylindrical nosepiece housing 32 forming the fore end of nosepiece 10 is removed. Consequently, no air (pneumatic) supply lines going to nosepiece 10 are disturbed when changing cutting tools.

Figure 4:
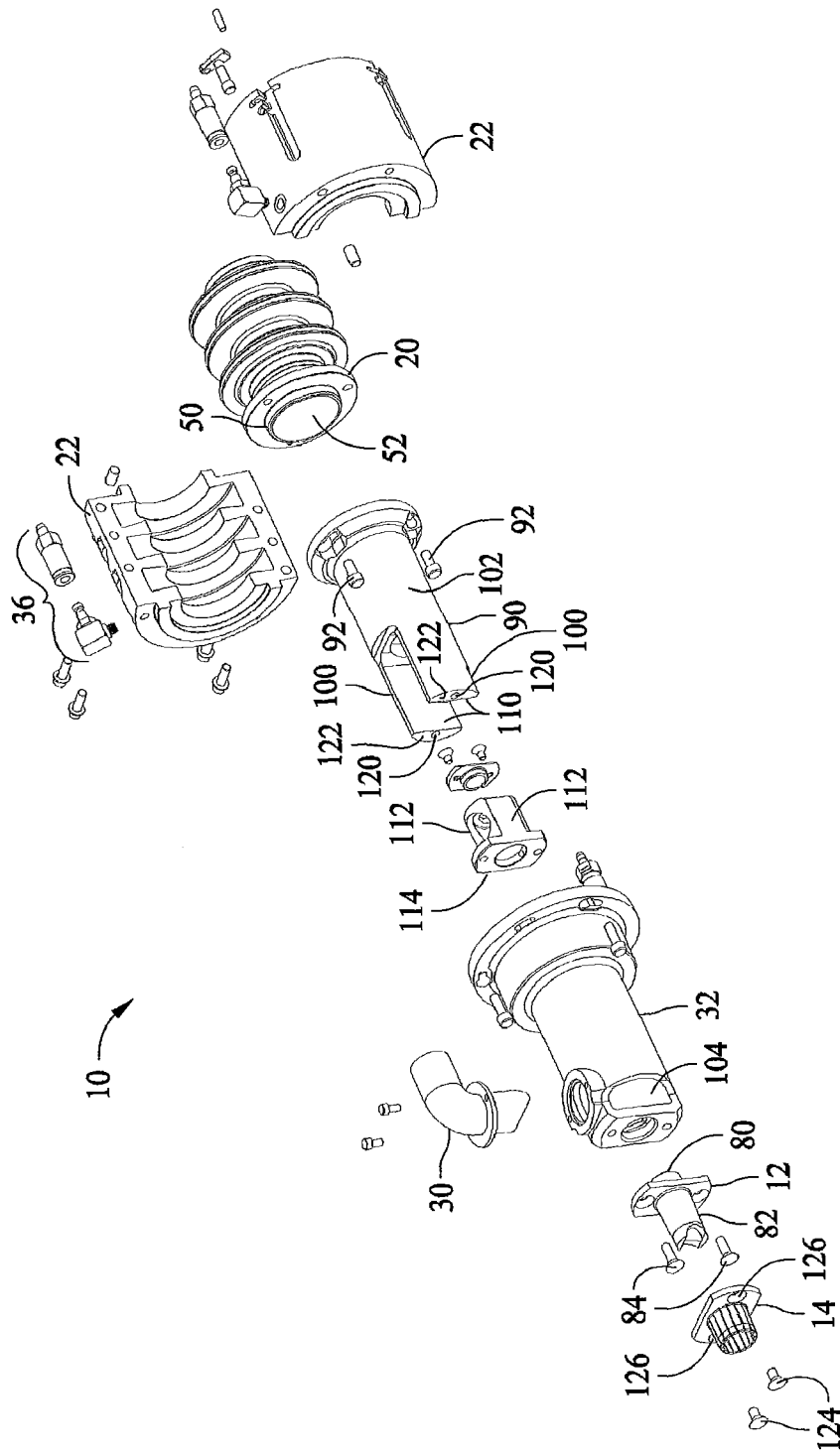
FIG. 4 is an exploded view of the collet clamping nosepiece of FIG. 1.

FIG. 4 is an exploded view of the collet clamping nosepiece 10 illustrated in FIGS. 1-3. As will be understood, a drill bit (not shown) inserted into a drill associated with collet clamping nosepiece 10, extends through the bore 52 of cylindrical shaft 50 and on through nosepiece housing 32, mandrel 12, and collet 14.

In use, the collating nosepiece 10 is secured to a drill plate (not shown in FIG. 4) with collet 14 and expansion mandrel 12 that has, in one embodiment, a guide bushing 80 on the inside diameter and a 2.5 degree taper 82 on the outside diameter. Expansion mandrel 12 does not move and is securely and rigidly mounted to nosepiece housing 32 with two screws 84. Expanding collet 14 is mounted over expansion mandrel 12. Expansion mandrel 12 is attached to an inner pull sleeve 90 that is attached to the piston 20 with fasteners 92. As the piston 20 travels rearward within piston housing 22, inner pull sleeve 90 moves along with it causing collet 14 to travel rearward and expand due to the taper associated with expansion mandrel 12. Piston 20 pulls the pull sleeve 90 and the collet 14 rearward with about 850 pounds of force, in one embodiment, which holds the drill in the drill plate (using expanded collet 14) even if the drilling thrust reaches 1,000 pounds.

In the embodiment, expansion mandrel 12 and the collet 14 are mounted to nosepiece housing 32 using only two screws each. Therefore, for removal and/or replacement of either of the mandrel 12 and collet 14, nothing else must be removed from nosepiece housing 32. Consequently, replacing the expansion mandrel 12 and collet 14, as both items are perishable due to wear, is relatively quick and easy. Additionally, the pull sleeve that attaches the collet 14 to the piston 20 is positioned inside nosepiece housing 32 to avoid pinch points and potential injury for an operator. Again referring to inner pull sleeve 90, it includes two collet engaging members 100 extending from a body portion 102 which are configured to pass through respective openings 104 in nosepiece housing 32, allowing attachment of collet 14 thereto as described herein. Collet engaging members 100 include flat surfaces 110 which slide along flat surfaces 112 of an alignment member 114 that is also fastened to an inside of nosepiece housing 32 with the two fasteners 84. The attachment of alignment member 114 to nosepiece housing 32 stabilizes an alignment of inner pull sleeve 90 (and collet 14) as it move back and forth due to the operation of piston 20. As seen in FIG. 4, collet engaging members 100 of inner pull sleeve 90 are configured with a bore 120 in each respective end 122 which provide for the attachment of collet 14 to collet engaging members 100 with two fasteners 124, which, in one embodiment described herein, are screws. As illustrated, collet 14 includes bores 126 which align with the bores 120 in collet engaging members 100 of inner pull sleeve 90, through which fasteners 124 are inserted.

To the rear of expansion mandrel 12, nosepiece housing 32 includes a vacuum collection tube 30 and a coolant delivery port 36 mounted thereto. Vacuum collection tube 30 is mounted at the position illustrated in FIG. 4 to extract composite dust and metal chips generated in the drilling operation. A mist of cutting oil from coolant delivery port 36 (not shown in FIG. 4) is directed onto the cutting tool (e.g., drill bit 104) when the cutting tool is in a retracted position (the time between the drilling of individual holes). During this time, a vacuum chip collection system, of which vacuum collection tube 30 is a part, is turned off so the oil has a chance to coat the cutting tool and not the vacuum collection system. During the drilling cycle, the vacuum collection system is turned on to catch the drilling debris and a coolant delivery system, of which coolant delivery port 36 is a part, is turned off so it doesn't reduce the effects of the vacuum collection system and cause "caking" of composite dust in the vacuum collection system. In some of the prior art systems described above, there are no provisions for coolant delivery, only vacuum collection. Consequently, the absence of cutting oil results in reduced hole quality. In another prior art system, there are provisions for both vacuum collection and coolant delivery, however, both systems are "on" all of the time. This type of configuration results in less efficient delivery of cutting oil to the cutter and caking of composite dust in the vacuum collection system The embodiments described herein result in increased cycle time savings due to increased efficiency in the use of portable power feed drilling equipment. Increased quality also has resulted since the reliability of the mechanism that clamps power feed drilling equipment to the drill plates is improved.

As drill 100 enables drilling directly adjacent to wedge-locks (which clamp the material being drilled (reducing burrs and improving rigidity)), improved hole quality will result. Easy access to the parts of drill 100 that typically require regular service (the collet 14 and the expansion mandrel 12), will result in man-hours savings within, for example, a set-up crib. Positioning of the piston 20 towards the rear of the nosepiece enables the use of standard six inch long cutters (e.g., drill bits), saving perishable tool costs on a re-occurring basis.

Improved vacuum collection associated with vacuum tube 30 saves man-hours required to clean out the existing collating nosepiece.

As the collet 14 described herein does not require a specific drill plate thickness, a drill plate liner, or a surface on the drill plate perpendicular to a center line of a fastener to be inserted into the drilled holes. As such, collet clamping nosepiece 10 can be implemented into a manufacturing operation, for example, without incurring additional tooling costs.

The fixed expansion mandrel 12 also acts as a chip breaker which prevents enlargement of the drilled hole at its entrance into the material being drilled. In prior art mandrel and collet configurations, they are deeply imbedded within the drilling tool mechanism. As such, the drilling tool in these configurations must be completely disassembled to replace the mandrel and collet. Consequently, they are not replaced as often as they should be, resulting in oversized holes in production.

While the invention has been described in terms of various specific embodiments, those skilled in the art will recognize that the invention can be practiced with modification within the spirit and scope of the claims.

What is claimed is:

1. A collet clamping nosepiece for a power feed drill comprising:
   at least one clamping piston located along a centerline of said nosepiece, said at least one clamping piston comprising a plurality of piston rings formed coaxially thereon;
   a piston housing configured to substantially surround said piston rod, said piston housing comprising a plurality of cylinder portions, each cylinder portion configured to substantially surround the respective said piston ring when said piston housing is assembled;
   an expansion mandrel comprising a frusto-conical exterior surface; and
   an expandable collet configured to substantially surround said expansion mandrel and operatively connected to said at least one clamping piston, operation of said at least one clamping piston causing said collet to move along said exterior surface of said expansion mandrel for engagement and disengagement of said collet with a bore configured for insertion of said collet.

2. A collet clamping nosepiece according to claim 1 wherein said expandable collet is configured for use with a plurality of drill plate thicknesses.

3. A collet clamping nosepiece according to claim 1 wherein said at least one clamping piston comprises a hollow cylindrical shaft, said plurality of piston rings arranged coaxially with and extending from said hollow cylindrical shaft.

4. A collet clamping nosepiece according to claim 1 wherein said respective cylinder portions of said housing are configured to have a sealing engagement with respective said piston rings.

5. A collet clamping nosepiece according to claim 1, wherein said at least one clamping piston is configured for pneumatic control within said piston housing.

6. A collet clamping nosepiece according to claim 1, said nosepiece comprising a fore end and an aft end, said at least one clamping piston located at said aft end and said collet located at said fore end, enabling utilization of said nosepiece in space constrained areas.

7. A collet clamping nosepiece according to claim 1 comprising two screw members, wherein said collet is attached to said nosepiece using said screw members.

8. A collet clamping nosepiece according to claim 1 wherein said expansion mandrel comprises a fixed expansion mandrel utilized to locate said nosepiece with respect to a surface of a structure.

9. A collet clamping nosepiece according to claim 1 wherein the operative connection between said expandable collet and said at least one clamping piston is located within said nosepiece.

10. A collet clamping nosepiece for a power feed drill comprising:
    an expandable collet located at a fore end of said nosepiece; and
    a piston assembly aligned axially with said expandable collet along a centerline of said nosepiece, said piston assembly operatively connected to said expandable collet and operable to expand and contract said expandable collet, said piston assembly comprising:
        a cylindrical piston rod comprising a plurality of piston rings formed coaxially thereon; and
        a piston housing configured to substantially surround said piston rod, said piston housing comprising a plurality of cylinder portions, each cylinder portion configured to substantially surround the respective said piston ring when said piston housing is assembled to have a sealing engagement with said plurality of piston rings.

11. A collet clamping nosepiece according to claim 10 further comprising a mandrel comprising a frusto-conical exterior surface, said mandrel located axially along a centerline of said nosepiece, said expandable collet configured for placement around the exterior surface of said mandrel.

12. A collet clamping nosepiece according to claim 11 wherein said mandrel comprises a guide bushing on an inside diameter and an approximate 2.5 degree taper on said exterior surface.

13. A collet clamping nosepiece according to claim 11 further comprising a nosepiece housing, said mandrel securely mounted to said nosepiece housing utilizing at least one fastening device.

14. A collet clamping nosepiece according to claim 10 further comprising a sleeve arranged coaxially with and extending from said cylindrical piston rod, said sleeve further comprising at least one hole formed therein for attaching a linkage to said expandable collet.

15. A collet clamping nosepiece according to claim 10 further comprising an inner pull sleeve, and wherein said mandrel is mounted to said inner pull sleeve, and said inner pull sleeve is attached to said cylindrical piston rod.

16. A collet clamping nosepiece according to claim 10 wherein said cylindrical piston rod and said plurality of piston rings are fabricated from one solid piece of material.

17. A collet clamping nosepiece according to claim 10 wherein said piston housing comprises two halves having a clamshell configuration.

18. A collet clamping nosepiece according to claim 10 further comprising at least one of a vacuum collection tube and a coolant delivery port.

* * * * *